United States Patent
Tait et al.

(10) Patent No.: US 8,136,460 B2
(45) Date of Patent: Mar. 20, 2012

(54) PORTABLE LOCKING SUPPORT AND PLATFORM SYSTEM

(75) Inventors: Michael Tait, Lititz, PA (US); Adam Davis, Lancaster, PA (US); James Fairorth, Lancaster, PA (US)

(73) Assignee: TAIT Towers, Inc., Lititz, PA (US)

( * ) Notice: Subject to any disclaimer, the term of this patent is extended or adjusted under 35 U.S.C. 154(b) by 954 days.

(21) Appl. No.: 12/135,574

(22) Filed: Jun. 9, 2008

(65) Prior Publication Data
US 2009/0301359 A1 Dec. 10, 2009

(51) Int. Cl.
*A47B 13/00* (2006.01)
*A47B 3/06* (2006.01)

(52) U.S. Cl. .................. 108/157.1; 108/156; 108/158.11

(58) Field of Classification Search .............. 108/153.1, 108/156, 157.1, 159.11, 158.11, 157.16, 108/101, 180–193; 182/178.5, 178.3, 178.1; 248/188.1, 188, 151, 168
See application file for complete search history.

(56) References Cited

U.S. PATENT DOCUMENTS

| | | | | |
|---|---|---|---|---|
| 2,621,879 A * | 12/1952 | Lundeen | | 108/53.5 |
| 2,673,700 A * | 3/1954 | Eberhardt | | 108/53.5 |
| 2,700,520 A * | 1/1955 | Skubic | | 108/53.5 |
| 2,844,344 A * | 7/1958 | Streb et al. | | 108/53.5 |
| 2,863,568 A * | 12/1958 | Skubic | | 108/53.5 |
| 3,730,109 A * | 5/1973 | Kreizel et al. | | 108/156 |
| 4,638,604 A | 1/1987 | Rogers et al. | | |
| 4,843,792 A * | 7/1989 | Rogers et al. | | 52/127.7 |
| 4,845,915 A * | 7/1989 | Rogers et al. | | 52/782.1 |
| 5,037,232 A * | 8/1991 | Pakdipanichpong | | 403/199 |
| 5,323,563 A * | 6/1994 | Rogers et al. | | 52/7 |
| 7,470,081 B2 * | 12/2008 | Miyahara et al. | | 403/221 |
| 7,703,401 B2 * | 4/2010 | Davis et al. | | 108/156 |
| 2007/0266908 A1 * | 11/2007 | Monteith et al. | | 108/53.1 |

* cited by examiner

*Primary Examiner* — Darnell Jayne
*Assistant Examiner* — Timothy M Ayres
(74) *Attorney, Agent, or Firm* — McNees Wallace & Nurick LLC

(57) ABSTRACT

A portable support system having a portable support having a first end and a second end. The first end includes a tapered portion, and the second end includes a footing structure. The system also includes a receiving member having a support cone configured to receive the tapered portion. The support cone has a tapered inner surface and a tapered outer surface. The inner surface and outer surface are engagable with mating tapered surfaces. The receiving member is capable of attachment to one or both of a frame and a panel for use as a platform.

24 Claims, 14 Drawing Sheets

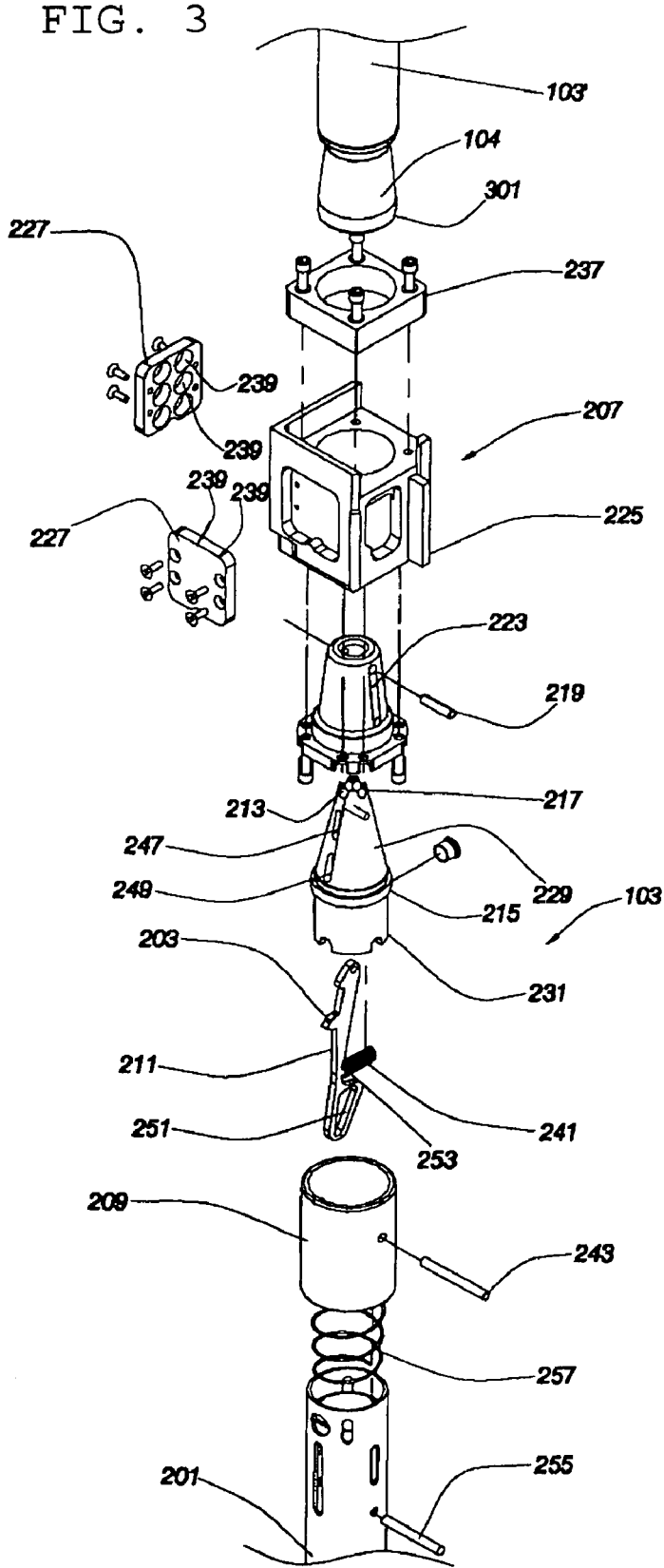

FIG. 10
FIG. 11
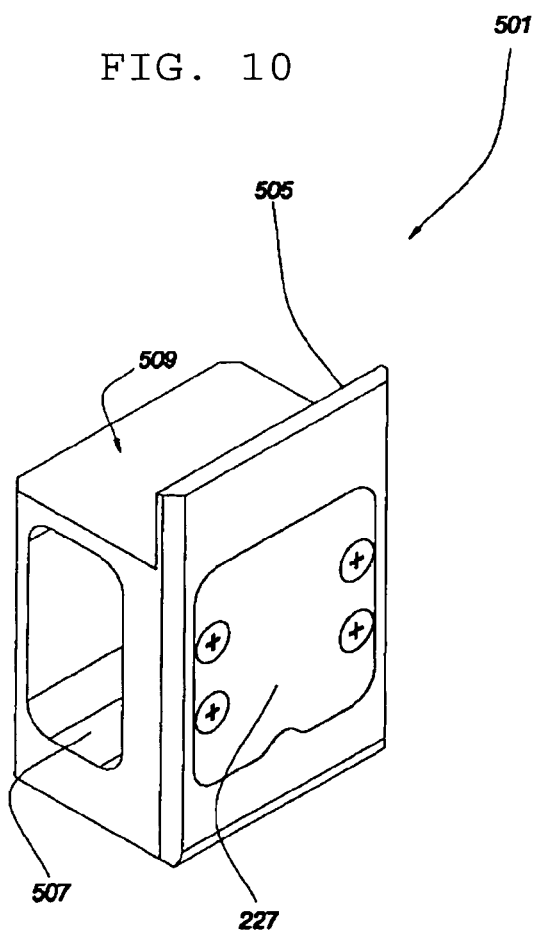
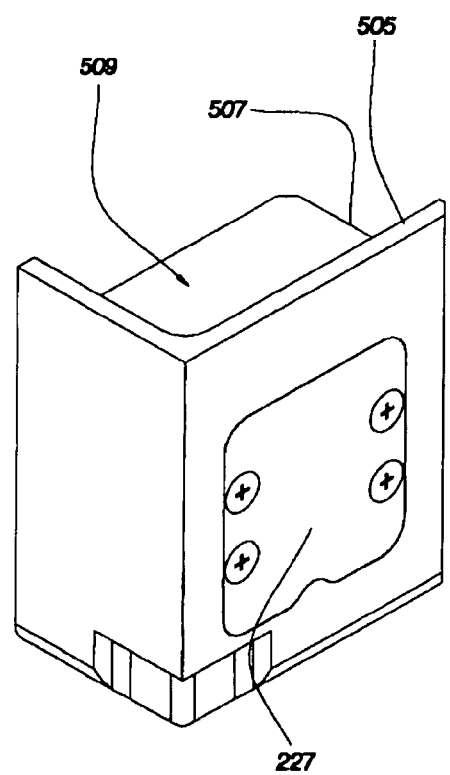

FIG. 13A
FIG. 13B
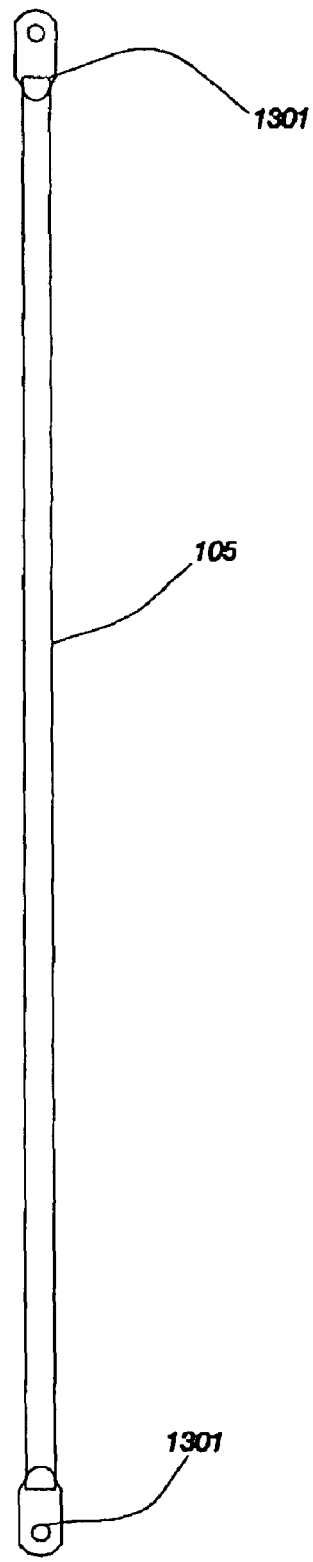
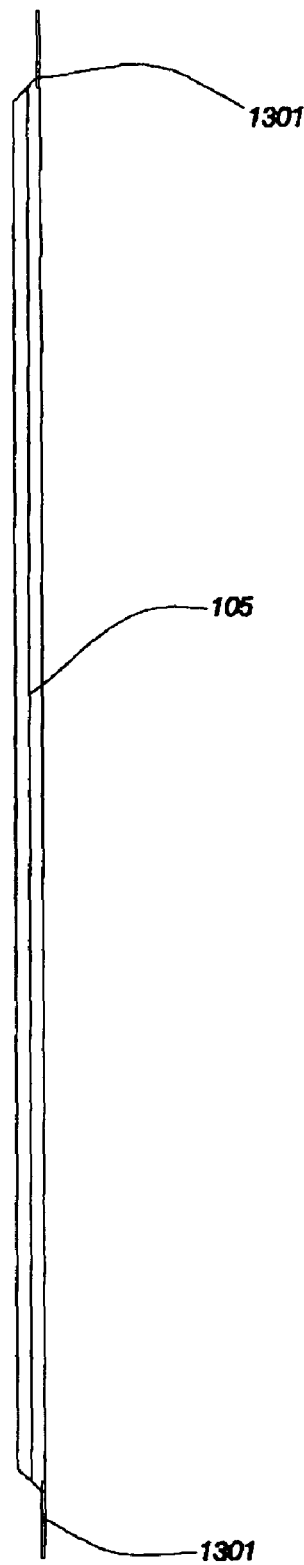

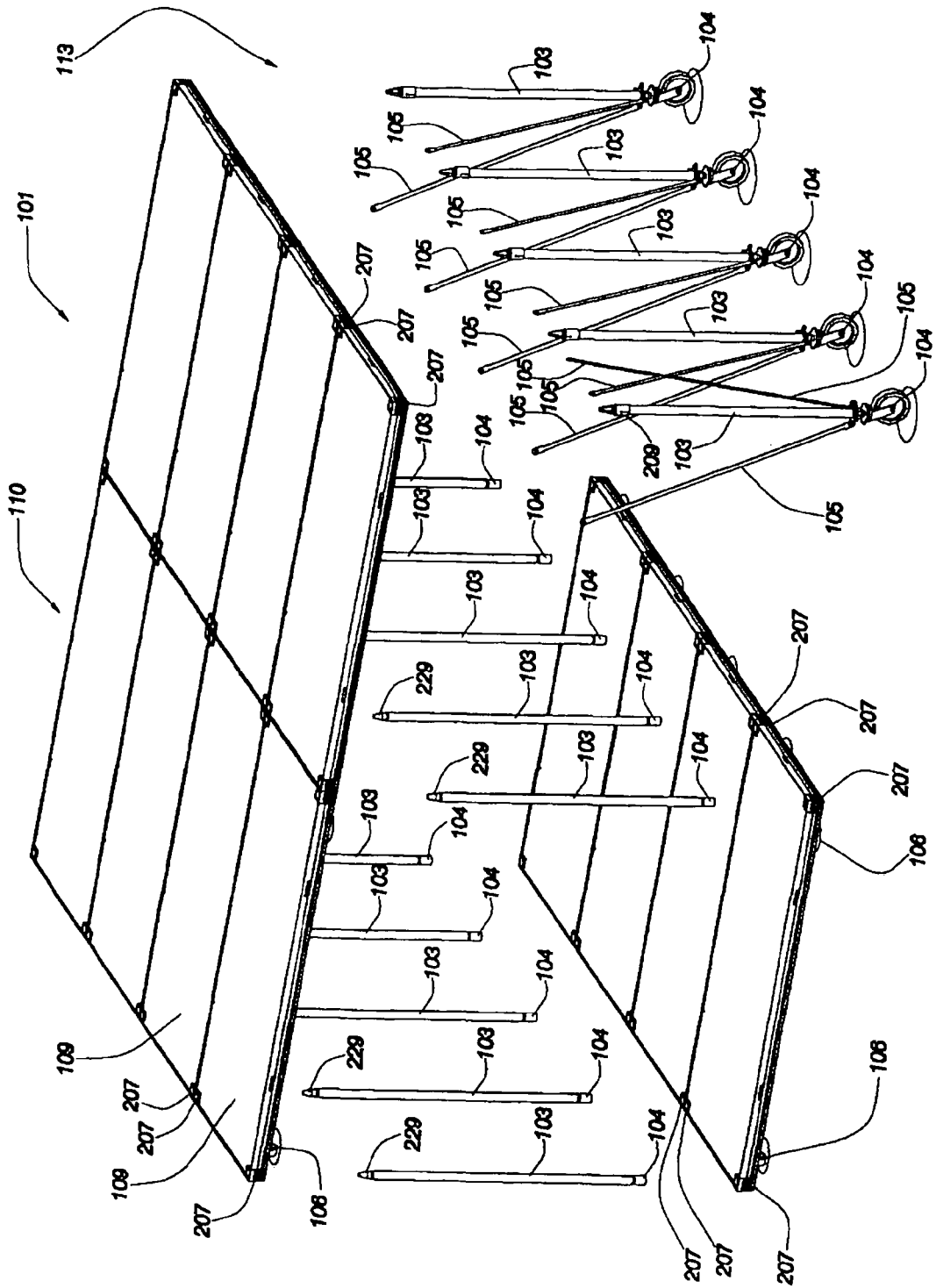

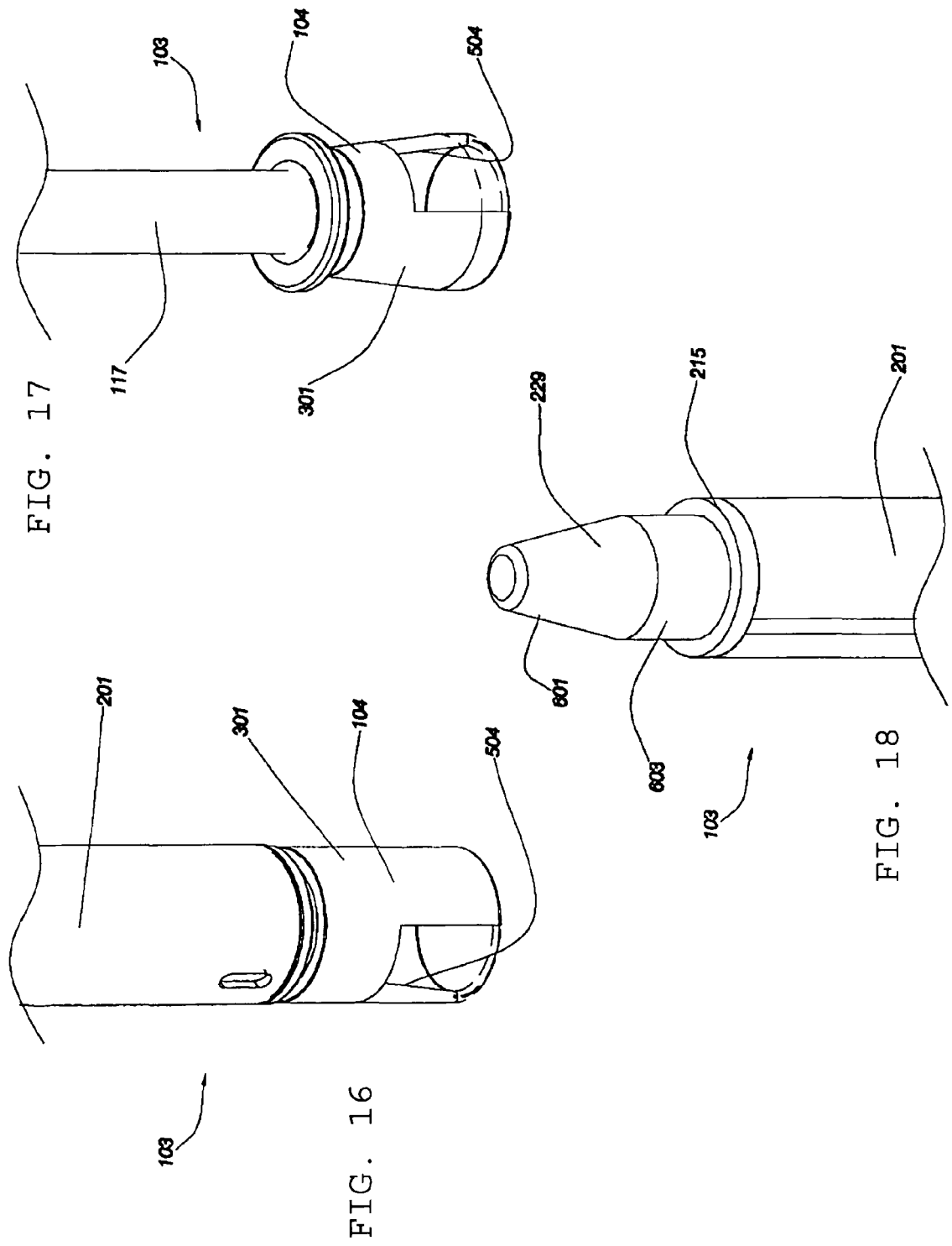

PORTABLE LOCKING SUPPORT AND PLATFORM SYSTEM

FIELD OF THE INVENTION

The present invention is directed to portable supports. In particular, the present disclosure is directed to portable supports used for portable stages or platforms.

BACKGROUND OF THE INVENTION

Portable structures, such as stages or platforms, must be capable of being assembled and disassembled into relatively small units that can be compactly and quickly loaded onto trucks or airplanes for transport. The portable structures must be capable of being assembled and disassembled by personnel with little or no technical skill. The portable structures support a large amount of weight and are subjected to external conditions, lateral forces, loud vibrations, and substantial wear.

The portable structures are generally comprised of systems of primary and secondary supports that provide the necessary stability. These systems are often comprised of supports requiring use of tools, such as wrenches and screwdrivers, to assemble and disassemble the portable structures. Locking mechanisms for supports have been used; however, they are difficult to assemble and disassemble, subject to misalignment, require a plurality of pieces, require tools for certain adjustments, do not offer adequate stability, do not have easily replaceable parts, and do not work well in conjunction with other parts of the portable structures.

Portable structures typically used in the art include those structures that have perpendicular members extending from the platform, which are attached at the joints between decking members. The structures known in the art suffer from the drawback that they are cumbersome to assemble, subject to misalignment, causing instability in the structure, and are subject to lateral forces during use.

What is needed is a portable support and a platform system that are easily assembled and disassembled with little or no technical skill, is not substantially subject to misalignment, requires few pieces, can be substantially assembled and disassembled by hand, offers the necessary stability, has replaceable parts, and works in conjunction with the other parts of the portable structure.

SUMMARY OF THE INVENTION

One aspect of the present disclosure includes a portable support system having a portable support having a first end and a second end. The first end includes a tapered portion, and the second end includes a footing structure. The system also includes a receiving member having a support cone configured to receive the tapered portion. The support cone has a tapered inner surface and a tapered outer surface. The inner surface and outer surface are engagable with mating tapered surfaces. The receiving member is capable of attachment to one or both of a frame and a panel for use as a platform.

Another aspect of the present disclosure includes a portable platform system including a frame, a panel supported by the frame; and at least one portable support system. The system includes a portable support system having a portable support having a first end and a second end. The first end includes a tapered portion, and the second end includes a footing structure. The system also includes a receiving member having a support cone configured to receive the tapered portion. The support cone has a tapered inner surface and a tapered outer surface. The inner surface and outer surface are engagable with mating tapered surfaces. The receiving member is capable of attachment to one or both of a frame and a panel for use as a platform. The system may further includes a second portable support system having a portable support having a first end and a second end, the first end having a tapered portion, and the second end includes a footing structure. The portable support of the second portable support system includes a latching feature extending through the tapered portion. The latching feature is actuatable to permit selective engagement and disengagement with a receiving member. The receiving member is attached to the frame and includes a support cone configured to receive the tapered portion. The portable support further includes a latching feature extending through the tapered portion. The latching feature is actuatable to permit selective engagement and disengagement with a receiving member.

Still another aspect of the present disclosure includes a method of assembling a stage. The method includes providing a frame and providing a panel to the frame. A receiving member is attached to one of the frame or the panel. A portable support is provided providing a portable support having a first end and a second end, the first end having a tapered portion, and the second end includes a footing structure, the receiving member having a support cone configured to receive the tapered portion, the support cone having a tapered inner surface and a tapered outer surface, the inner surface and outer surface being engagable with mating tapered surfaces. The receiving member is capable of attachment to one or both of the frame or the panel for use as a platform. The portable support is directed into the receiving member to provide engagement therewith.

One advantage of the present disclosure is ease of assembly and disassembly of the portable structure, reducing the possibility for assembly error in the portable structures, including in multi-level portable structures.

Another advantage of the present disclosure is the ability for individuals with little or no technical skill to assemble or disassemble the portable supports and the platform systems.

Still another advantage of the present disclosure is the substantial stability of the portable structure due to the portable support minimizing swaying, bending, and other lateral forces.

Still another advantage of the present disclosure is the relatively small number of separate parts required for use of the portable support in conjunction with the stage or platform system.

Still another advantage of the present disclosure is the ability to substantially be assembled, disassembled, and adjusted by hand.

Still another advantage of the present disclosure is that the portable support may be positioned and locked in the standing position, making the installation quicker and less burdensome on the assembler.

Still another advantage of the present disclosure is that the portable support occupies less space when it is detached from the other parts of the portable structure and, thus, diminishes the space required for transportation and storage of the portable structure using the portable support.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 shows an elevational view of a portable support according to an embodiment of the disclosure.

FIG. 3 shows an exploded view of a portable support, and a corresponding receiving member according to an embodiment of the present disclosure.

FIG. 10 shows a top perspective view of a casing attachment according to an embodiment of the present disclosure.

FIG. 11 shows a top perspective view of a casing attachment according to another embodiment of the present disclosure.

FIGS. 13A and 13B show orthogonal views of a secondary support according to another embodiment of the present disclosure.

FIG. 14 shows an exploded view of a portable support system according to an embodiment of the present disclosure.

FIG. 16 shows a top perspective view of a footing structure according to an embodiment of the present disclosure.

FIG. 17 shows a top perspective view of a footing structure according to another embodiment of the present disclosure.

FIG. 18 shows a top perspective view of a portion of portable support according to another embodiment of the present disclosure.

Wherever possible, the same reference numbers will be used throughout the drawings to represent the same parts.

DETAILED DESCRIPTION OF THE INVENTION

Figure 1:
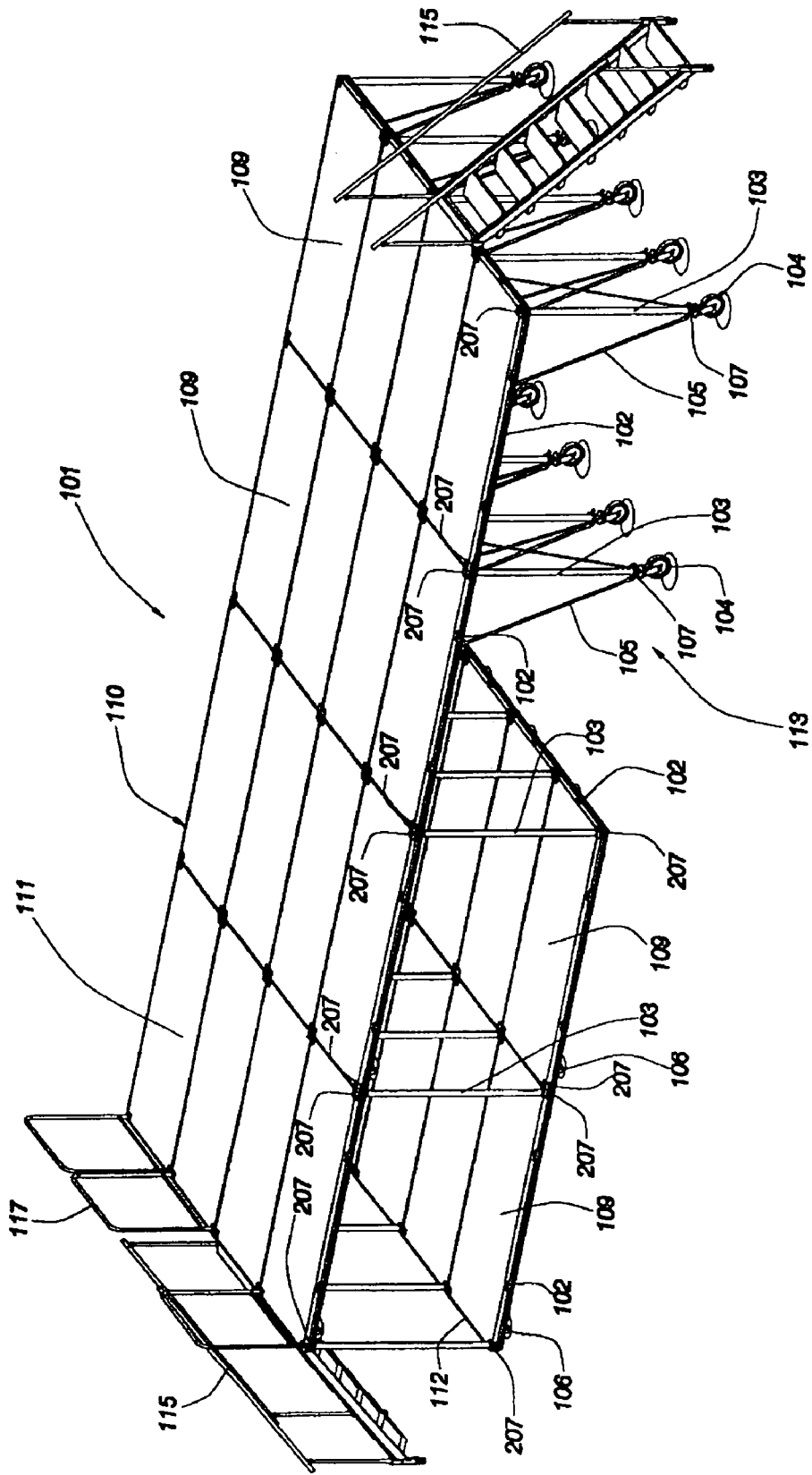
FIG. 1 shows a top perspective view of a portable platform system according to an embodiment of the disclosure.

FIG. 1 shows a platform system 101 comprising a plurality of frames 102 supported by portable supports 103, a plurality of secondary supports 105, and having a plurality of the platform panels 109 thereon. The platform panels 109 may be any type of panels 109 desirable for use with the platform system 101. In addition, panels 109 may include structural, aesthetic and/or theatrical components. For example, the platform panels 109 may include plywood, glass, metal, video components, lighting components, or any other structural, aesthetic and/or theatrical component. In addition, the frames 102 each include four receiving members 207 (see e.g., FIG. 2 and 3). Although this embodiment is shown with frames 102 having four receiving members 207, the frames 102 may contain any number of receiving members 207 suitable for providing the support for the frame 102 and the panels 109. The embodiment shown in FIG. 1 includes a multilevel portion 110 and a single level portion 113. Each of the multilevel portion 110 and the single level portion 113 are made up of a plurality of frames 102 and panels 109. The frame 102 and panels 109 on the upper section 111 of the multilevel portion 110 are supported by a plurality of portable supports 103. The portable supports 103 extend from the lower section 112 of the multilevel portion 110. The portable supports 103 are engaged with receiving members 207 of frames 102 in the lower section 112. The portable supports 103 in the multilevel portion 110 may be friction fit and held by gravity or may be locked into place with a locking mechanism (see e.g., FIGS. 2-3). Other mechanisms may be provided to further engage the portable supports 103 to the receiving members 207. For example, grooves, features, and interlocking features may be utilized to further provide engagement between the portable support 103 and receiving member 207. The single level portion 113 includes a plurality of portable supports 103 arranged to support a single level of frames 102 and panels 109. The portable supports 103 in the single level portion 113 includes secondary supports 105 that engage the frame 102 and the secondary support structure 107. The secondary supports 105 provide increased resistance to lateral forces.

Also shown in FIG. 1 are wheels 106, which provide contact with the underlying surface of the platform system 101. Although wheels 106 are shown, other structures may be utilized including, but not limited to, rollers, fixed feet, stakes, posts, or other structures suitable for engaging the surface underlying the platform system 101. As shown in the multilevel portion 110, the wheels 106 are attached to the panels 109 and/or frame 102 to permit rolling or moving of the system 101 even after assembly. Likewise, the single level portion 113 includes footing structures 104 having wheels that are attached to the portable support 103 and permit rolling or moving of the system 101 even after assembly. In another embodiment of the disclosure the footing structures 104 can be substituted with a stabilizing device. The stabilizing device could be a device formed of a solid substance (such as concrete, plastic, or other solids that can be worked with in liquid form), a mechanical system providing shock absorption, or other systems sufficient to provide stability for the portable support 103 and/or frame 102.

The receiving members 207 arranged along the frame 102 to permit engagement with portable supports 103 from either the top surface or from the bottom to permit stacking of platform levels. That is, portable supports may be mated to the receiving member 207 from two directions, permitting the formation of multiple levels. Although the multilevel portion 110 is shown as two platform levels, any number of additional levels may be formed. In addition, the distance between platform levels may vary by providing portable supports 103 of varying lengths on each level.

In addition, the receiving members 207 permit engagement with additional staging structures desirable for staging or platform use. For example, while not so limited, as shown in FIG. 1, additional staging structures, such as stairs 115, may be engaged to the platform system 101 by insertion of a portion thereof into receiving members 207. Likewise, railings 117 may also be inserted into receiving members 207. Engagement may include any suitable engagement into receiving member 207, including, but not limited to gravity, interlocking, latching or magnetic attraction. Other staging structures may likewise be engaged to the platform system 101 by engagement with the receiving member.

The platform system 101 is easily assembled and disassembled by people of little or no technical skill. In addition, the platform system 101 provides resistance to lateral forces such as swaying or bending, the platform system 101 is not substantially subject to misalignment, the platform system 101 requires few pieces for assembly, the platform system 101 usually does not require tools for assembly or disassembly, the platform system 101 offers the necessary stability, the platform system 101 has replaceable parts, and the platform system 101 works in conjunction with the other parts of the platform system 101.

FIGS. 2 and 3 shows an embodiment of the portable support 103 engaged with a receiving member 207 according to an embodiment of the present disclosure. The portable support 103 comprises a support member 201, a locking mechanism, and a footing structure 104. The portable support 103, as shown in FIG. 2, is substantially a cylindrical support but could be of any geometry capable of supporting the frame 102 and panels 109 and loads provided thereon. The support member 201 can be made of any material but is best made of light weight and durable materials that can withstand external environmental conditions, abuse by people of little or no technical skill, and frequent transportation. The support member 201 is also best made of a material that allows for the application of a coating. This coating can be used for aesthetic purposes or to improve the ability of the support member 201 to withstand external environmental conditions. In one embodiment, a plurality of the support members 201 may be fabricated with substantially identical dimensions or marked with an identifier, such as colors, in order to allow the support members 201 to be interchanged, reducing the possibility for assembly error, especially in the assembly of the multilevel platform system 101.

Figure 4:
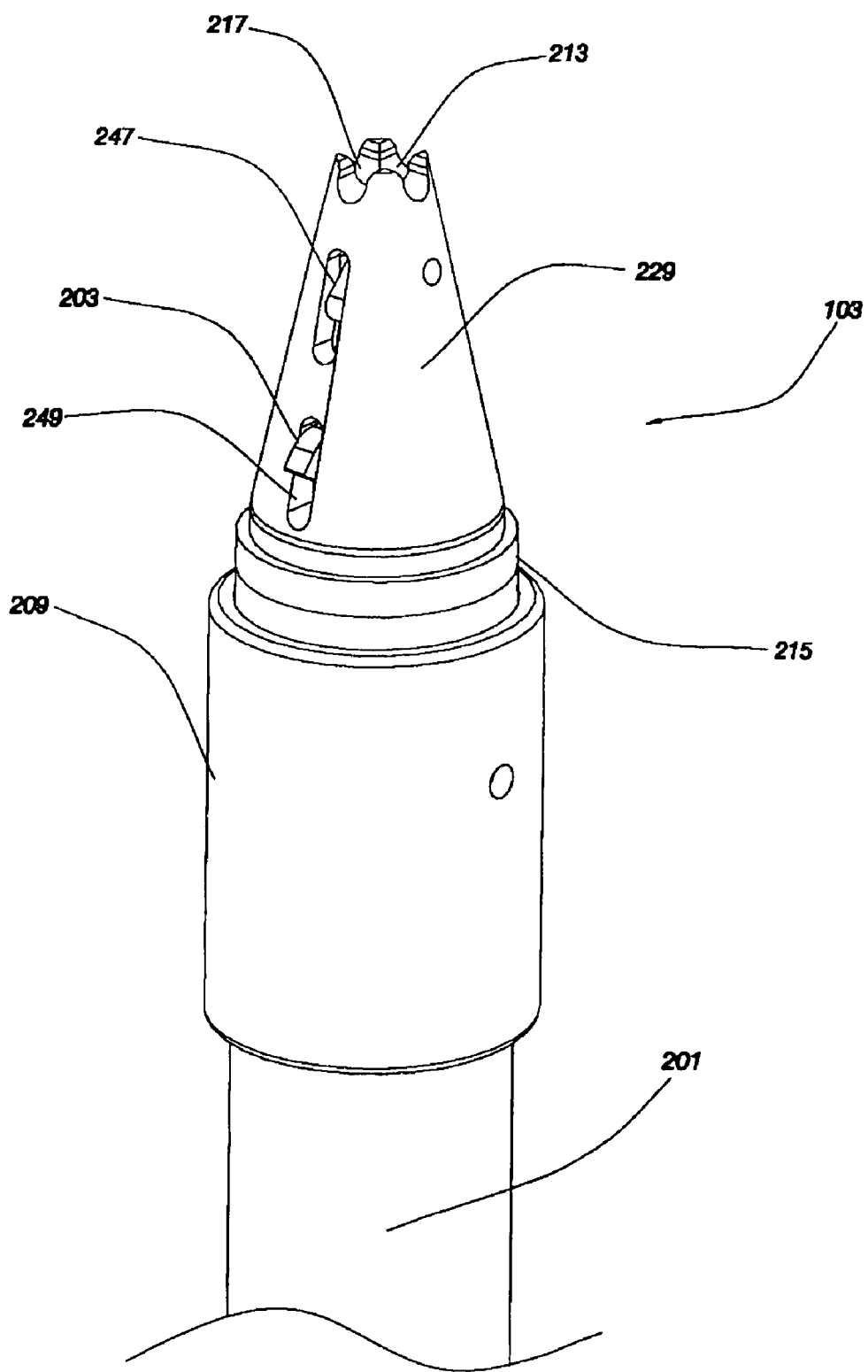
FIG. 4 shows a portable support according to an embodiment of the disclosure.

The tapered portion 229 is attached to or unitarily formed at an end of the support member 201 (see e.g., FIG. 4). A footing structure 104 is attached to an end of the support member 201 opposite tapered portion 229. As shown in FIG. 2, the tapered portion 229 is engaged with receiving member 207.

One embodiment of the present disclosure, as visible in FIG. 3, includes a locking mechanism made up of a retention device 211, latching feature 203, alignment member 213, flange 215, tapered portion 229, attachment portion 231, and at least one channel 217. In the system 101 shown in FIG. 1, the locking mechanism is present in the portable supports 103 present in the single level portion 113. The locking mechanism may be positioned in multiple orientations by lining up channel 217 with the pin 219 of the receiving member 207 (see e.g. FIG. 3). Releasing mechanism 209 is arranged along a surface of the support member 201. The releasing mechanism 209 is preferably arranged as a sleeve or otherwise gripable structure that is manipulatable by hand. The releasing mechanism 209 can be operated by hand to disengage the retention device 211 and latching feature 203. The latching feature 203 is a latch, protrusion or other feature of the retention device 211 that engages one or more surfaces of the receiving member 207. The latching feature 203 extends through the tapered portion 229 and provides a surface extending therefrom that is capable of engaging a surface of the receiving member 207. As shown in FIG. 3, a series of mounting pins 243 and springs 241 are operably mounted to provide the releasably pivotable structure of the retention device 211 and the releasing mechanism 209. However, the structure of the portable support is not limited to the particular arrangement shown in FIG. 3.

The locking mechanism comprises a retention device 211 and latching feature 203, an attachment portion 231, and an alignment member 213, which further comprises at least one channel 217. The tapered portion 229 can be manually inserted into the receiving member 207. Upon inserting the tapered portion 229 into the receiving member 207, a pin 219 in the receiving member is lined up with the channel 217 in the locking mechanism to position the orientation of the locking mechanism in relation to the receiving member 207. In one embodiment the locking mechanism produces an audible clicking noise indicating that it is properly engaged to the receiving member 207. Upon fully inserting the locking mechanism into the receiving member 207, the retention device 211 engages a catch in the receiving member 207. The catch can be a hole, a slot, a groove, a notch or any other structure or feature allowing for the latching feature 203 to releasably attach lip 218 (see FIG. 5) of the receiving member 207. To disengage the locking mechanism 203, the releasing mechanism 209 is manually adjusted, resulting in the retention device 211 disengaging the latching feature 203 from the receiving member 207.

Figure 5:
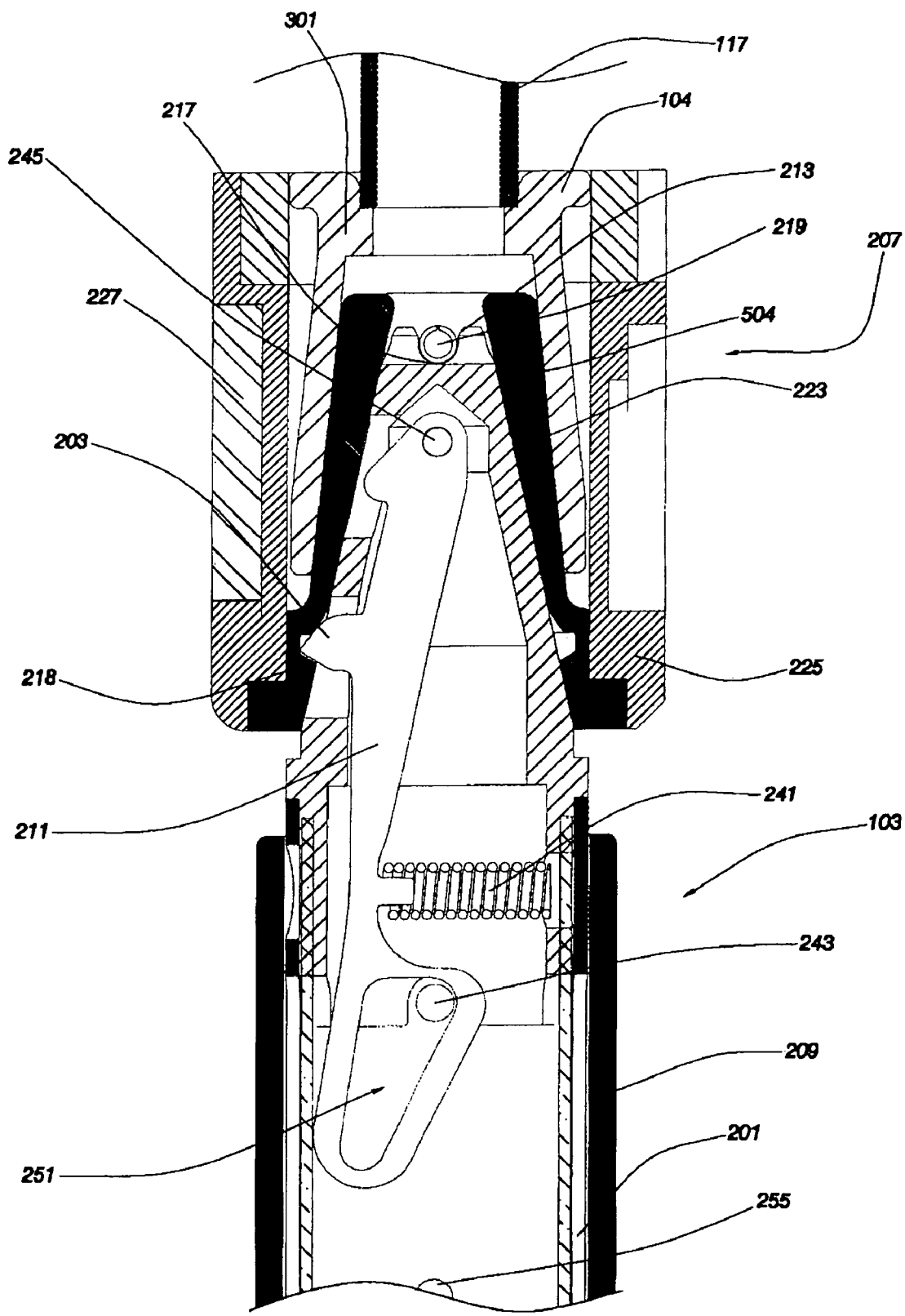
FIG. 5 shows a cross-sectional view of a portable support in engagement with a receiving member according to an embodiment of the present disclosure.

As shown in FIGS. 3-5, operation of locking mechanism is now described. A pin 245 secured in tapered portion 229 also provides a pivotable connection with retention device 211. As shown in FIG. 4, slots 247 and 249 are found in tapered portion 229. Slot 247 provides visibility of the interior of tapered portion 229 to simplify installation of pin 245 through retention device 211. Latching feature 203 extends through slot 249 to permit engagement with lip 218 (see FIG. 5). An opening 251 is formed in retaining device 211 to receive pin 243 that is secured in releasing mechanism 209. Disposed between opening 251 and latching feature 203 is a protrusion 253 that is configured to receive spring 241. Spring 241 urges locking mechanism 203 to pivot about pin 245 so that locking mechanism 203 extends through tapered portion 229. A spring 257 is disposed between a pin 255 secured in support member 201 and pin 243 secured in releasing mechanism 209. Spring 257 urges releasing mechanism 209 to move along support member 201 toward tapered portion 229.

In operation, in response to receiving member 207 being aligned and directed over and into engagement with tapered portion 229 of portable support 103, the inside surface of support cone 223 makes contact with latching feature 203. Further directed movement of receiving number 207 with respect to portable support 103 urges latching feature 203 to pivotably retract through slot 249 sufficiently to permit latching feature 203 to engage lip 218. This engagement, normally accompanied by an audible "click", secures receiving member 207 to portable support 103.

To release receiving member 207 from portable support 103, application of a sufficient force applied to releasing mechanism 209 in a direction away from tapered portion 229 urges releasing mechanism 209 away from tapered portion 229. Pin 243 engages opening 251, compressing spring 241, and urging or actuating retention device 211 to pivotably move about pin 245 so that latching feature 203 recedes within slot 249. After latching feature 203 sufficiently recedes to disengage lip 218, receiving member 207 may be separated from portable support 103. It is to be understood that other arrangements may also be used.

In addition, the embodiment shown in FIG. 3 includes a second portable support 103' extending from the receiving member 207. Although the embodiment shown includes a second portable support 103', stairs 115, railings 117 or other structures may include a footing structure 104 configured to engage support cone 223 of receiving member 207 and may be engaged with the receiving member (see e.g., FIG. 1).

In one embodiment, the tapered portion 229 of portable support 103 resembles a tapered or frusto-conical geometry. The tapered portion 229 is not limited to a frusto-conical shape, and may include conical, pyramidal or other tapered geometries capable of transmitting loads at non-perpendicular angles. The tapered portion 229 provides an angle that allows resistance to lateral forces when engaged with receiving member 207. Further, the tapered portion 229 assists in alignment and ease of assembly.

The attachment portion 231 of portable support 103 may be attached to the support member 201 in any suitable manner. In one embodiment, the attachment portion 231 may be shrink fitted into a hollow support portion by heating the support member 201 to a temperature sufficient to cause the support member 201 to expand to a diameter sufficient to permit the fitting of the attachment portion 231, wherein the support member 201 is cooled to tighten the connection. A flange 215 may also be provided to permit easy attachment of the attachment portion 231 to the support member 201 and easy alignment of the attachment portion 231 to the receiving member 207 during assembly.

Figure 12:
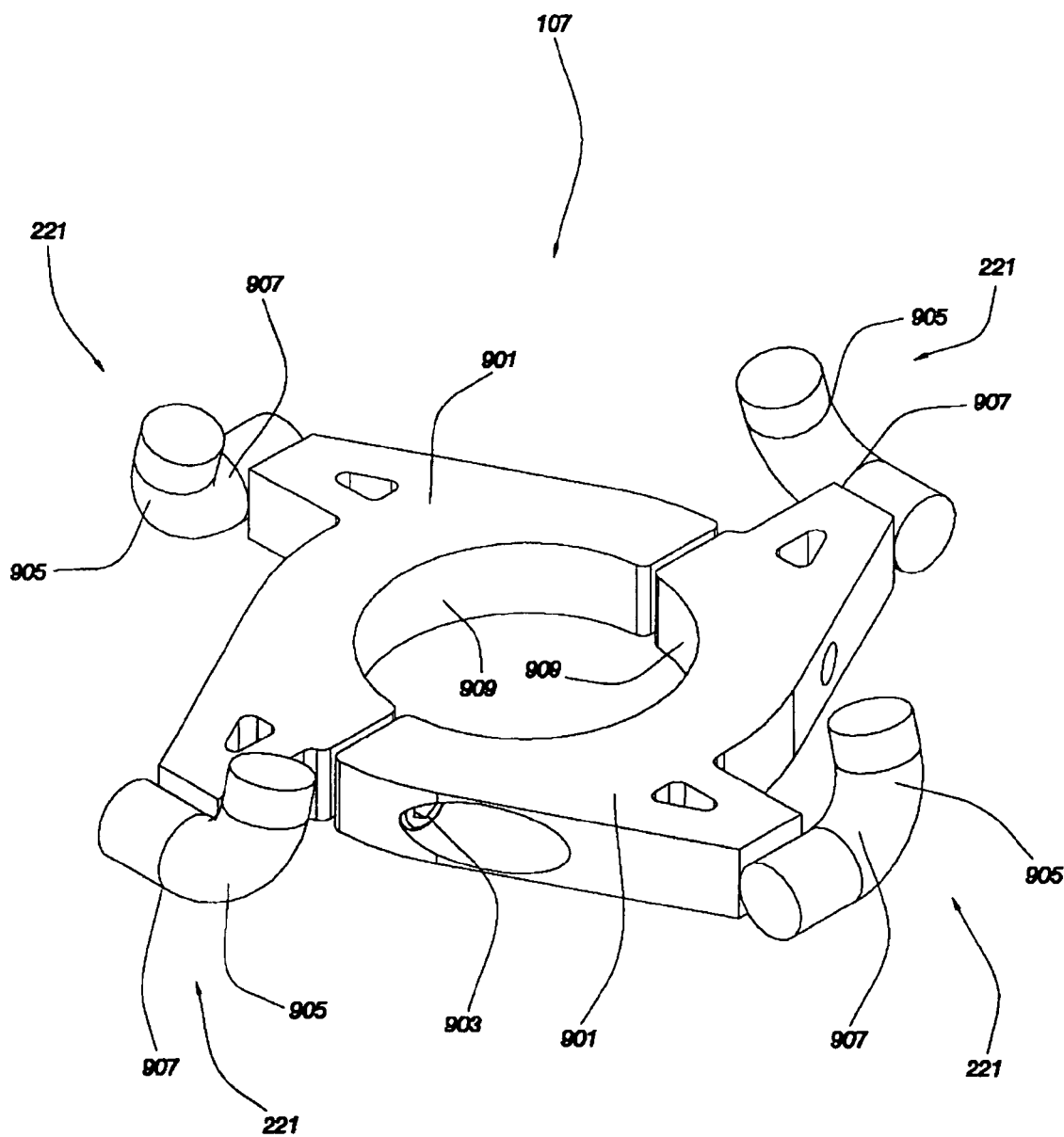
FIG. 12 shows a top perspective view of a secondary support structure according to another embodiment of the present disclosure.

FIG. 2 further shows the secondary support structure 107, which is optional, comprising a set of the hook members 221 (see e.g., FIG. 12). Hook members 221 are arranged to permit at least one of the secondary supports 105 to be attached to the secondary support structure 107 allowing increased stability for the platform system 101. The engagement of the locking mechanism with the receiving member 207 includes a rotational positioning that arranges the hook members 221 in an orientation that permits placement and locking engagement of the secondary supports 105 to the portable support 103 and to the frame 102 (see e.g., FIG. 1). The secondary supports 105 may be fastened to the frame 102 in any suitable manner, including by fasteners, latches, hooks or other clipping or retaining structures.

As visible in FIG. 3, the receiving member 207 comprises support cone 223, pin 219, and casing 225. The support cone 223 is geometrically configured to allow the locking mechanism to substantially fit within the support cone 223. The pin 219 is replaceably affixed within the support cone 223 to allow at least one of the channels 217 of the locking mechanism 203 to engage the pin 219. The casing 225 includes a geometry that allows the portable support 103 to support the platform panel 109 (shown in FIG. 1), stage, or platform system 101. As shown in FIGS. 2 and 3, the casing 225 of the receiving member 207 can include at least one magnetic panel 227. The magnetic panel 227 includes a plurality of magnets 239 that are arranged to magnetically attract adjacent receiving members 207. In one embodiment the magnetic panel 227 includes six magnets 239 having alternating polarities of north and south. For example, the magnets 239 may be arranged in a north-south-north arrangement in a first set and a south-north-south arrangement in a second, adjacent set. The arrangement of alternating magnetic polarities permits the simultaneous attraction and alignment along multiple directions from receiving members 207 having magnets 239 arranged in a corresponding arrangement.

The receiving member 207 further includes a pin 219. The pin 219 is of a geometry configured to mate channel 217 of the locking mechanism 203 and provide rotational positioning of the portable support 103. Although an embodiment includes a single pin 219, multiple pins 219 can be used. The pin 219 can be of a cylindrical geometry, a cuboid geometry, or any substantially similar geometry. During the initial assembly of the receiving member 207, pin 219 may be inserted into two cavities on opposite sides of the support cone 223. Preferably, the pin 219 can be removed or replaced allowing the remaining parts of the receiving member 207 to be used if the pin 219 becomes damaged. In one preferred embodiment, the location of the pin 219 in the support cone 223 is as close to the distal end of the support cone 223 in relation to the support member 201 as possible. In another embodiment of the present disclosure, instead of having the pin 219, the receiving member 207 is configured with at least one alternate channel corresponding to the channel 217 of the alignment member 213.

The support cone 223 of the receiving member 207 is of a geometry substantially similar to the tapered portion 229 allowing the locking mechanism, including the tapered portion 229 and latching feature to fit inside of the support cone 223 and engage therewith. In one embodiment, the geometry of the support cone 223 resembles a frusto-conical geometry. The support cone 223 is made of a material that can withstand insertion of the locking mechanism 203 without the need to expend significant effort to align the locking mechanism 203 and the support cone 223. The support cone 223 preferably further includes a geometry to receive a tapered footing structure 104, stairs 115, railing 117 or other structures. The tapered surfaces of the support cone 223 may be the same or different. That is, the angle of the tapered surface may be the same or dissimilar on opposite edges of the support cone 223 (see e.g., FIG. 5). In the embodiment wherein the tapered surface are of different angles, the fitting of the components can be verified or customized to particular, predetermined components to prevent mis-assembly with insertion of incorrect components. In one embodiment, the support cone 223 is made of a material that can withstand the impact of the locking mechanism 203 being repeatedly and forcibly inserted into the support cone 223. Upon insertion of the portable support 103, the mating latching feature 203 of the retention member 211 latches a lip 218 or other surface or feature formed in the receiving member 207.

The casing 225 of the receiving member 207 is an external portion of the receiving member 207, providing attachment to frame 102 and providing structural support for the support cone 223. In one embodiment, the casing 225 is of a cuboid geometry. However, the casing 225 could be in the geometry of a cube, other hexahedron, or any other geometry with a top surface that is flat and at least one side surface that is flat. Having additional flat surfaces is preferred because the casing 225 can then be placed under the corner of a platform system 101 or under any other part of the platform system 101. A collar 237 is attached to the casing 225 with fasteners or by other methods and provides alignment of engaging structures and protects the components within and on the receiving member 207. Further, although not shown, collar 237 may be fitted with a cap or other structure to conceal the internal components, such as the support cone 223, of the receiving member 207 in the event that it is not desired to include structure on the upper side of the receiving member. The configuration of casing 225 allows for easier assembly of the platform system 101 because the receiving members 207 can be treated as interchangeable and a plurality of frames 102 having receiving members 207 may be brought together. Another aspect of an embodiment includes having at least one magnetic panel 227 on the side surface of the casing 225. The magnetic panel 227 allows for metal plates to be magnetically attached to the casing 225. Otherwise, the plates are attached with adhesives or hardware. In the platform system 101 the metal plates attached to multiple casings 225 provide a front surface for the stage, preventing people from walking underneath the platform system 101 and providing aesthetic benefits. In one embodiment, two flat side surfaces on the casing have magnetic panels 607. The arrangement allows for the receiving member 207 to be placed under the corner of the platform system 101 or any other part of the platform system 101, allowing for easier assembly of the platform system 101 because the receiving members 207 can be treated as interchangeable.

In one embodiment, the footing structure 104 on the portable support 103 may include a frusto-conical geometry or similar geometry. Tapered, frusto-conical, and conical geometry of the footing structure 104 on the portable support can allow the portable support 103 to stand without additional support. This allows additional portable supports 103 to be positioned on a platform or stage. Once the portable supports 103 are all positioned and engaged, a second platform or stage may be positioned and engaged at the distal end of the receiving member 207 of the portable support 103. The second stage or platform forms the second level for a multilevel platform system 101. The process may be repeated horizontally and/or vertically to produce a larger platform or stage on multiple levels. Tapered, frusto-conical, and conical geometry of the primary support structure 205 distribute the lateral forces allowing the platform system 101 to maintain stability, without swaying or bending, even when there are lateral forces present. In addition, the tapered, frusto-conical, and conical geometry help prevent misalignment of the portable support 103 by providing an engagement surface, the support cone 223, that aligns itself and allows people having little or no technical skill to assemble the multilevel platform systems 101 quickly and easily. Disassembly is also easily achieved by reversing this process.

The secondary support structure 107 (see FIGS. 2 and 12) is attached circumferentially to the support member 201. In an embodiment, the secondary support structure 107 is positioned at or near the end of the portable support 103 opposite the receiving member 207. The secondary support structure 107 can be positioned anywhere on the support member 201. Positioning the secondary support structure 107 at or near the end of the portable support 103 opposite the receiving member 207 may provide increased stability. One embodiment of the secondary support structure 107 includes a hook member 221 (see FIG. 12). The hook member 221 allows for at least one secondary support 105 to be attached to the portable support 103, allowing increased stability for the platform system.

FIG. 4 shows an embodiment of the portable support 103. The locking mechanism 203 comprises the retention device 211, an optional flange 215, the tapered portion 229, and the alignment member 213. The alignment member 213 comprises at least one channel 217. The at least one channel 217 can be configured to position the orientation of the locking mechanism 203 and, therefore, the portable support 103 (shown in FIG. 1). To position the orientation of the locking mechanism 203, the channel 217 is lined up with the pin 219 (not shown in FIG. 4) within the receiving member 207 (not shown in FIG. 4). In this embodiment, the attachment portion 231 is within the releasing mechanism 209 inside the support member 201.

FIG. 5 shows a cross-sectional view of a portable support 103 in engagement with a receiving member 207. As shown in FIG. 5, the tapered portion 229 is in engagement with an inner surface 501 of support cone 223. The inner surface 501 of support cone 223 preferably includes an angle configured to receive the tapered portion 229. The angle of inner surface 501 is configured to provide a surface that engaged the portable support 103 and resists lateral movement or flexing. In addition, the embodiment shown in FIG. 5 includes a footing structure 104 connected to a railing 117. Although the embodiment shown includes a railing 117, the footing structure 104 may be attached to stairs 115, or other structures having a footing structure 104 and an angled inner surface 504 and may be engaged with an outer surface 503 of support cone 223 of receiving member 207 (see e.g., FIG. 3). The outer surface 503 is configured with an angle that provides sufficient engagement and retention of the footing structure 104 that the railing 117 or portable support 103 is substantially prevented from twisting or wrenching out. That is, the engagement of footing structure 104, as coupling member 301 is sufficient to permit unsupported placement of portable supports 103 into receiving members 207 having lengths of 8 feet or greater, while retaining a substantially perpendicular positioning and resisting tipping or falling over. Such unsupported placement preferably permits the placement of a plurality of portable supports 103 prior to providing an additional level of frames 102 and panels 109, wherein additional levels can be lifted onto the unsupported portable supports 103 with one or only a few personnel.

Figure 6:
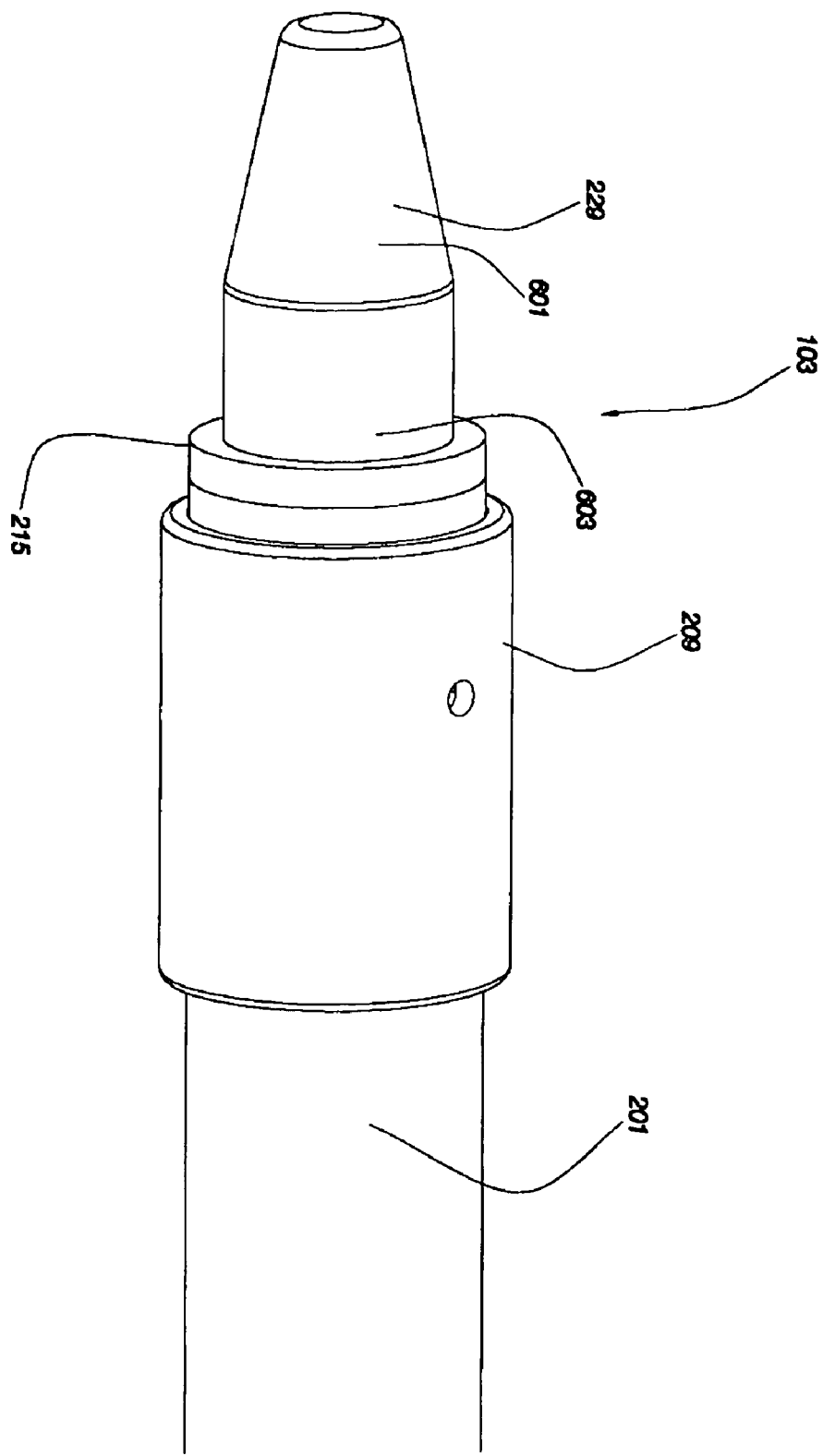
FIG. 6 shows a portable support according to another embodiment of the disclosure.

FIG. 6 shows substantially the same arrangement as shown and described with respect to FIG. 4. However, in the embodiment shown in FIG. 6, the tapered portion 229 includes a first taper 601 and a barrel portion 603. The arrangement of portable support 103 in this embodiment permits the inclusion of addition devices or supports to be engaged with the tapered portion 229. For example, a support having openings corresponding to the barrel portion 603 may be positioned over the barrel portion 603 and locked into place. Such supports may be provided over spans or walkthroughs, for example, where secondary supports 105 may be undesirable.

Figure 7:
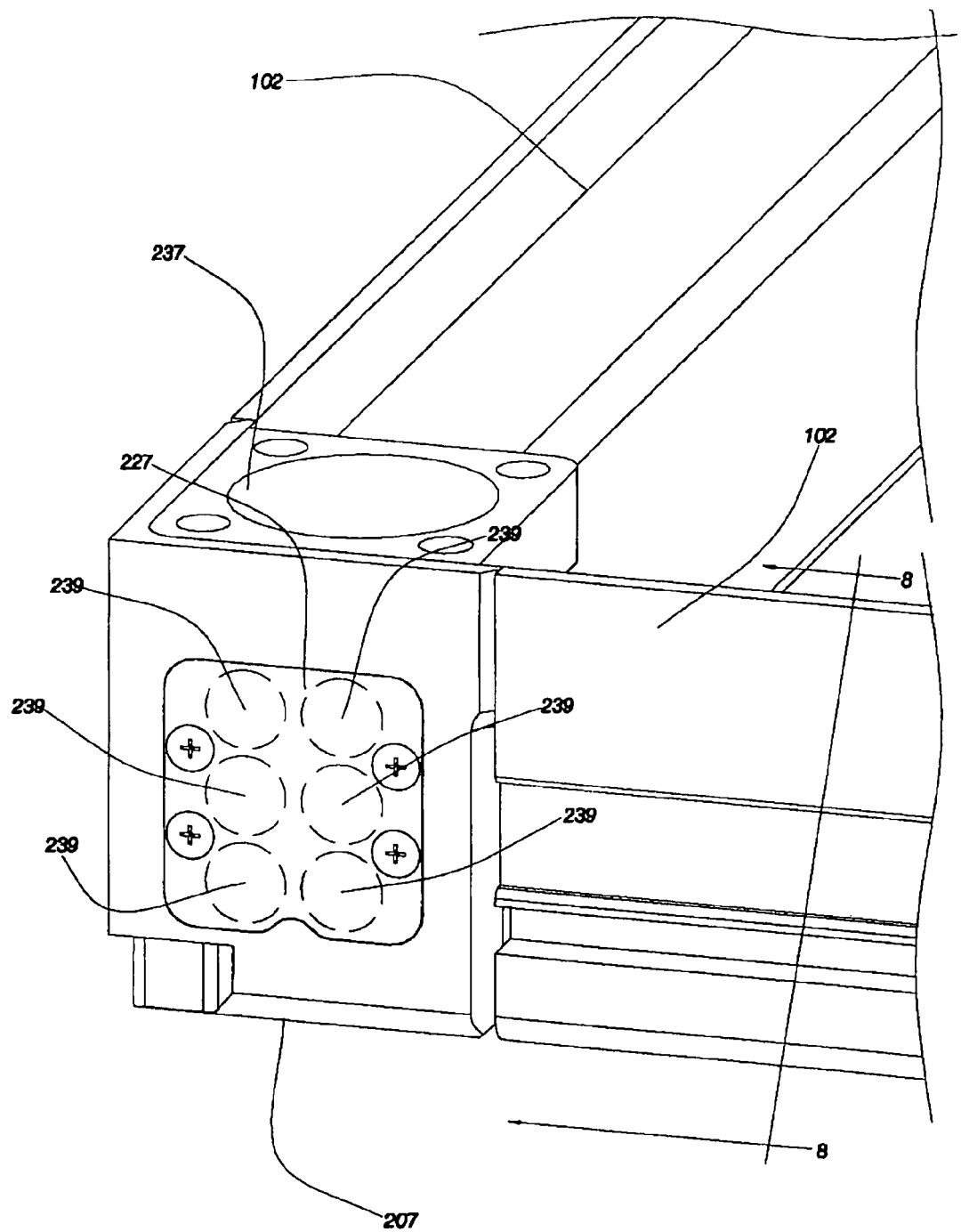
FIG. 7 shows a top perspective view of a portion of a frame and receiving member according to an embodiment of the present disclosure.

FIG. 7 shows a portion of the platform system 101 wherein the frame 102 is attached to the receiving member 207. The magnetic panel 227 provides magnets 239 arranged to align and engaged adjacent frames 102 and magnetic panels 227. As discussed above in one embodiment, the magnets 239 preferably disposed in a north-south-north polarity arrangement to provide the alignment. In addition, as shown the frame 102 is attached to receiving member 207. The attachment may be provided by any suitable attachment technique, including welding, adhesive, fasteners, interlocking or any other attachment that provide sufficient retention to support the frame 102, the panel 109 (removed in FIG. 7, see also FIG. 1) and any load thereon.

Figure 8:
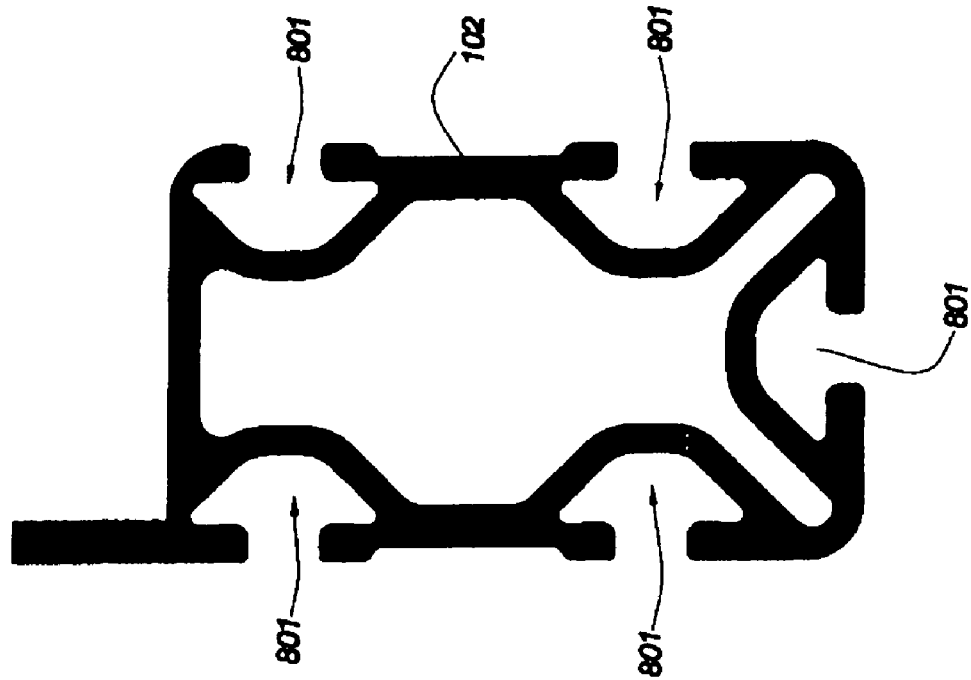
FIG. 8 shows a sectional view of a frame according to an embodiment of the present disclosure.
Figure 9:
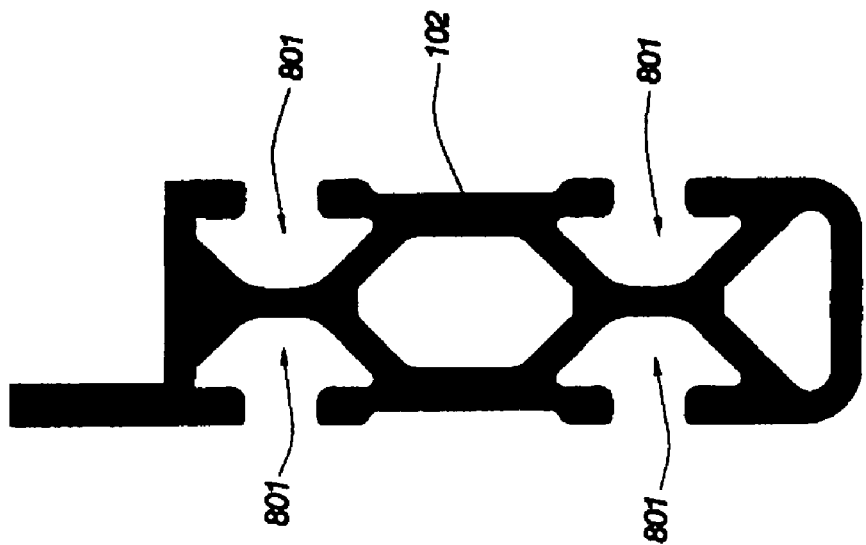
FIG. 9 shows a sectional view of a frame according to another embodiment of the present disclosure.

FIGS. 8 and 9 show alternate embodiments of the frame 102 according to embodiments of the present disclosure. FIGS. 8 and 9 are cross-sectional views of the frame 102 of FIG. 7, taken along line 8-8. As shown, the frame 102 includes locking cavities 801 into which accessories or other devices may be inserted and locked into position. Such accessories or devices may include aesthetic components, theatrical components, structural components, or any other components useful for attachment to frame 102.

FIGS. 10 and 11 show additional support structure to attach to or otherwise engage frame 102. The additional support corresponds to the structures selected from the group consisting of a longitudinal casing attachment 501, the latitudinal casing attachment 503, and any combinations thereof. The longitudinal casing attachment 501 (see e.g., FIG. 10) comprises the casing attachment panel 505, which is preferably a magnetic panel 227, as shown and described above in FIG. 3, and the alternative support slot 507. The latitudinal casing attachment 503 (see e.g., FIG. 11) comprises the casing attachment panel 505 and the alternative support slot 507. The casing attachment panel 505 can include several screws for attaching the casing attachment panel 505 to the casing 225; however, the casing attachment panel 505 can be attached to the casing 225 by using the magnetic panels 607, an adhesive, welding, or any other method of attachment. The support slots 507 preferably receive frame 102 and are supported thereby. The width and height of the additional supports can be modified to fit specific needs of the platform system 101. The longitudinal casing attachment 501 has a narrower width and a taller height. The latitudinal casing attachment 503 has a wider width and a shorter height. The casing attachments 501, 503 further include a panel support areas 509, which is arranged to receive panel 109, when the platform system 101 is assembled. In one embodiment of the present disclosure, the casing 225 works in conjunction with both the longitudinal casing attachment 501 and the latitudinal casing attachment 503. The alternative support slot 507 can be of any geometry configured to the additional support. In one embodiment, the alternative support slot 507 includes a rectangular opening permitting a wood plank to be inserted into the alternative support slot 507 as the additional support; however, the additional support can be made of any material sufficient to provide the necessary support.

The secondary support 105 is attached to the secondary support structure 107 and another structure. The other structure could be a fitting on the stage or platform, could be another secondary support structure 107 on another portable support 103, could be a fitting on another portable support 103, or could be a fitting on an additional support. In an embodiment of the disclosure, the secondary support structures 107 are located at ninety degrees, circumferentially, on the portable support 103 (see FIG. 12). In an embodiment of the disclosure (see FIG. 1), the secondary supports 105 for the internal portable supports 103 on a platform or stage are attached to four secondary supports 105 radiating from the portable support 103. In an embodiment, there are two secondary supports 105 on the portable supports 103 located on the corner of the stage or platform system. In an embodiment, there are two secondary supports 105 on the portable supports 103 that are on the outside perimeter of the stage or platform. This configuration of the secondary supports 105 permits stability with a minimal amount of obstruction. Nonetheless, any or all of the secondary supports 105 may be removed.

FIG. 12 shows a secondary support structure 107 according to an embodiment of the present invention. As shown and described with respect to FIG. 2, the secondary support structure 107 includes a plurality of hook portions 221. The hook portions 221 extend from a secondary support structure attachment portion 901. The secondary support structure attachment portion 901 includes a geometry that is suitable for attachment to the portable support 103. The attachment portion 901 embodiment shown in FIG. 12 includes a pair of clamp-like structures that are fastened together by fasteners 903. The attachment portion 901 includes an attachment surface 909 that attaches to the portable support 103 (See FIG. 2) upon sufficient engagement of fasteners 903 to draw the attachment surfaces 909 into compressive contact with the portable support 103. The attachment portion 901 is not limited to the geometry shown in FIG. 12, and may include any geometry that permits the attachment of the secondary support structure 107 to the portable support 103. The attachment of the secondary support structure 107 to the portable support 103 may take place using any suitable method, including frictional attachment provided by fasteners 903, adhesive, thermal shrink fit, welding or providing a unitary portable support 103 having the structure of the secondary support structure 107 integrally included. Although FIG. 12 shows four hook portions 221, the secondary support structure 107 may include any number of hook portions 221 and may include a hook portion 221 for each support member 107 that is in locking engagement with the secondary support structure 107. Additionally, the secondary support structures 107 may be fabricated with a symmetrical arrangement of hook portions 221, such as the four hook portions 221 shown in FIG. 12, for ease of assembly and alignment of the portable support 103 when the portable support structure 100 is assembled. The hook portions 221 include a curved portion 905 that has a radius of curvature that allows a secondary support connector 1301 of a secondary support 105 to be directed over the hook portion 221. The curved portion includes an engagement surface 907 that is capable of engaging the secondary support connector 1301 and reacting to forces transmitted through the secondary support 105. When the secondary support connector 1301 is in position and in engagement with the engagement surface 907, the curved portion 905 locks the secondary support connector 1301 in place and prevents disengagement, thereby retaining the secondary support 105 in locking engagement.

FIGS. 13A and 13B illustrate two orthogonal views of a secondary support 105 according to an embodiment of the invention. FIGS. 13A and 13B show support member 105 having a substantially cylindrical geometry including two ends that each include secondary support connectors 1301 in the form of eyelets. The secondary support 105 may have any suitable geometry that is capable of transferring force from the frame 102 to the portable supports 103 when the system 101 is assembled (see, for example, FIG. 1). As discussed above with respect to FIG. 1, the secondary support connectors 1301 may include any structure that is suitable for engaging the frame 102 and the secondary support structure 107 on the portable support 103. The secondary support structure at the each end of the secondary support 105 may be the same, or the secondary support connector 1301 connectors may be different from each other. In addition, secondary support connector 1301 may be configured in any suitable geometry that includes one end that is capable of detachably engaging the frame 102 and one end that is capable of being in locking engagement to the secondary support structure 107.

FIG. 14 shows an exploded view of the platform system 101 of FIG. 1. As shown in FIG. 14, the system 101 comprising a plurality of the frames 102 supported by portable supports 103, a plurality of the secondary supports 105, and having a plurality of the platform panels 109 thereon. In addition, the frames 102 each include four receiving members 207. The portable support 103 in the single level portion 113 includes secondary supports 105 that engage the frame 102 and the secondary support structure 107. The secondary supports 105 provide increased resistance to lateral forces. The portable supports 103 include tapered portions 229, which are received by receiving member 207. To release the portable supports the releasing mechanism 209 is actuated, preferably by hand, and the portable support 103 is removed from the receiving member 207. In the multilevel portion 110, the portable supports 103 include footing structures 104 that have an inward taper (see e.g., FIG. 5), which is received by the lower receiving members 207. While the attachment of the tapered footing structures 104 is shown and described as a gravity fit, other attachment may be provided including latches, fasteners or interlocking features of the mating components. Panels 109 may be attached to each other by additional methods, if desired to provide additional support and stability. For example, latches, coffin locks, splines, fasteners or other devices may be affixed to frame 102 to engage adjacent frames 102 to provide a stable, locked engagement on the surface having panels 109.

Figure 15:
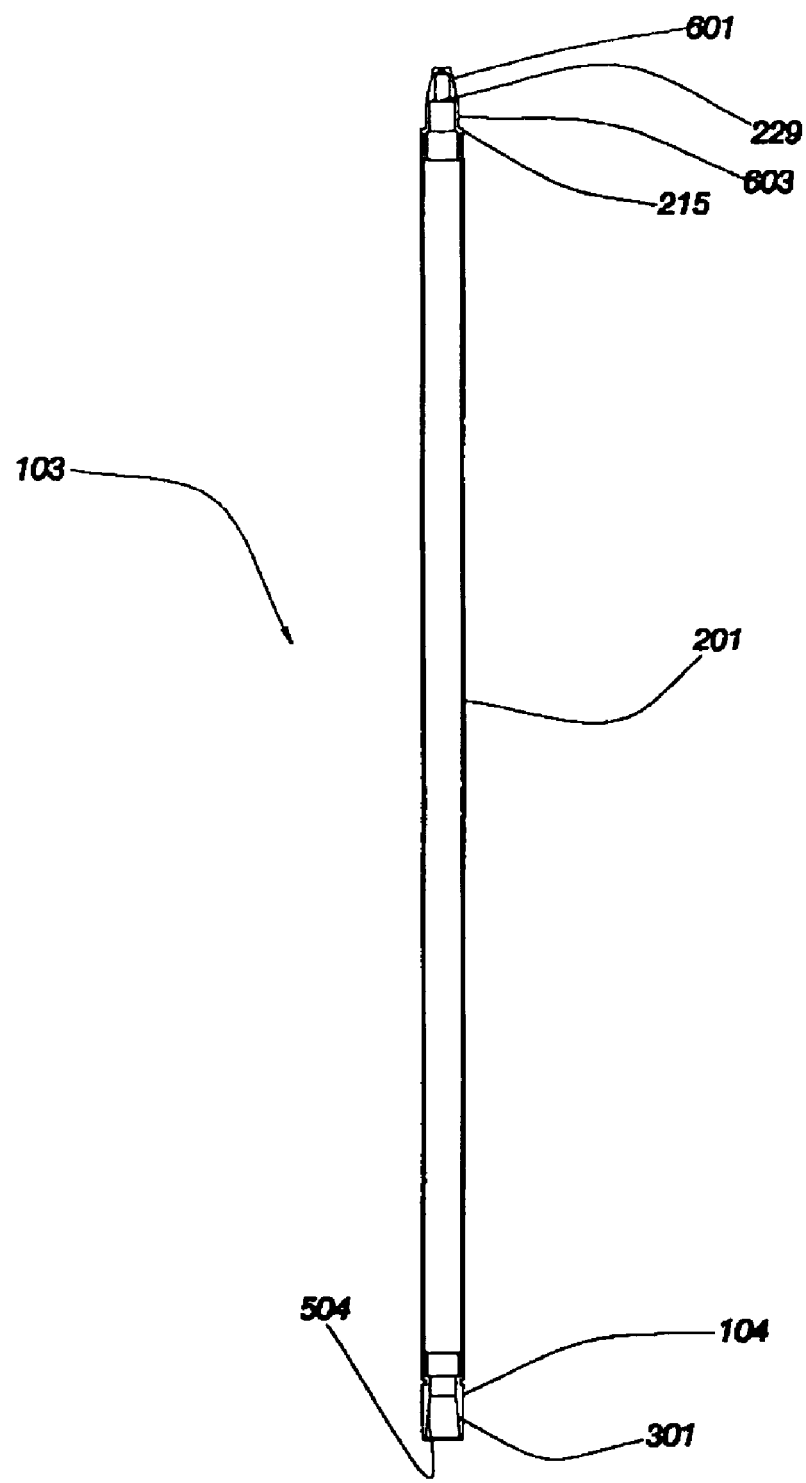
FIG. 15 shows a cross-sectional view of a portable support according to another embodiment of the present disclosure.

FIG. 15 shows cross-sectional view of a portable support 103 according to another embodiment of the present invention. The portable support in this embodiment includes a tapered portion 229 and a footing structure 104 having a coupling member 301. The coupling member 301 includes an angled inner surface 504 having an angle that correspondingly mates with the outer surface 503 of support cone 223 of a corresponding receiving member 207. The angle of the outer surface 503 and the inner surface 504 is such that the portable support 103 may maintain unsupported perpendicular positioning (i.e., substantially perpendicular to panel 109) (see e.g., multiple level portion 110 of FIGS. 1 and 14), during assembly.

FIG. 16 shows a coupling member 301 as footing structure 104, wherein the coupling member 301 includes an inner surface 504 and attaches to a support member 201. FIG. 17 shows a coupling member as footing structure according to an alternate embodiment, wherein the coupling member 301 is configured to attach to railing 117 or may also be configured to attach to stairs 115 (see e.g., FIG. 1).

As shown in FIG. 18, multilevel portion 110 (see e.g., FIG. 14) includes the portable support 103 substantially as shown in FIG. 15. The tapered portion 229 includes flange 215, a first taper 601 and a second barrel portion 603. The tapered portion 229 is attached to support member 201. During assembly, as discussed above, the portable supports 103 are preferably positioned, unsupported on a level of panels 109, frames 102 and receiving members 207. By unsupported, it is meant that all of the support is provided by the engagement of the tapered portion 229 and the support cone 223. A receiving member 207 of an upper level of panels 109, frames 102 may be positioned over the tapered portion 229 and is permitted to engage.

Figure 19:
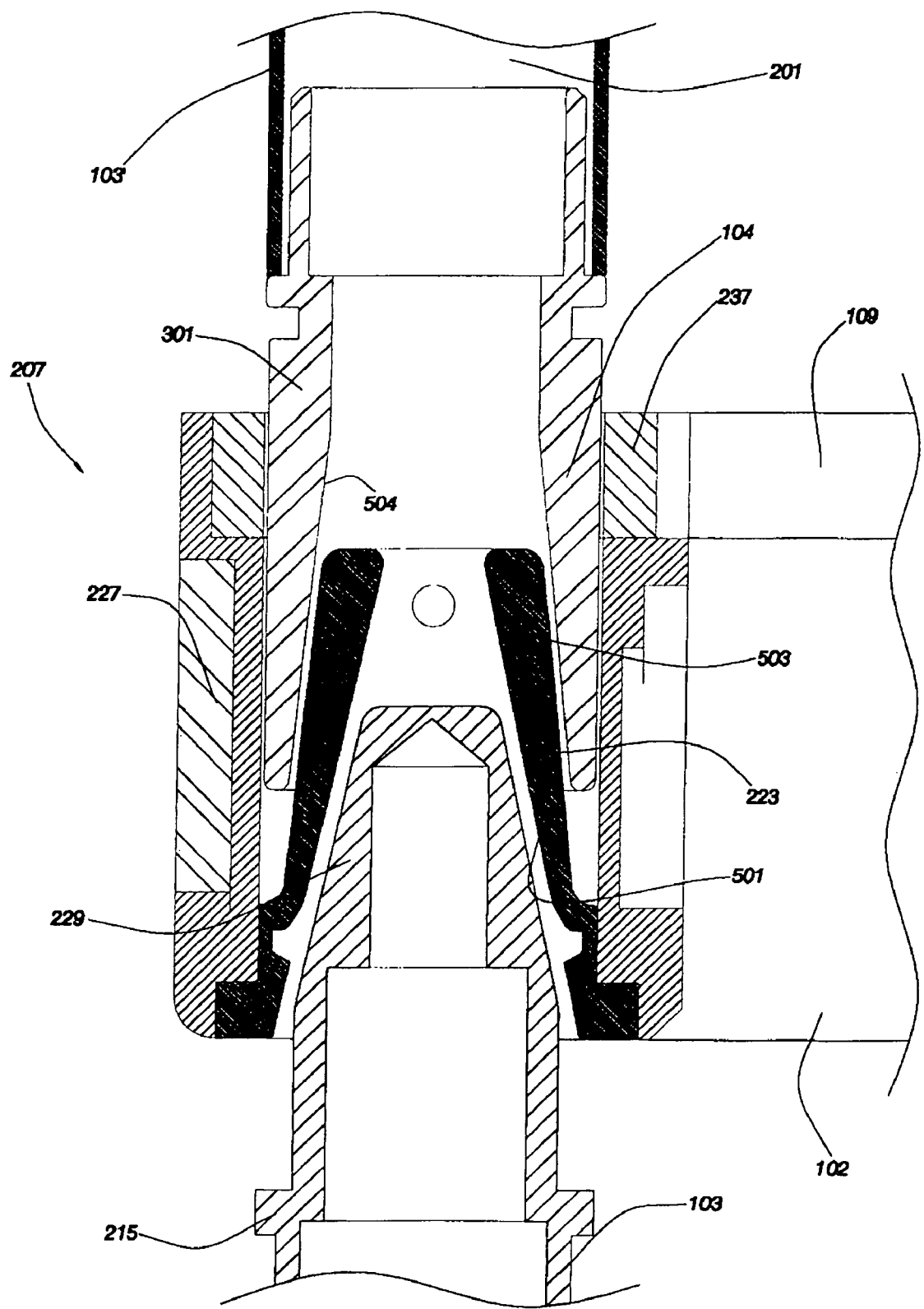
FIG. 19 shows cross-sectional view of a junction of portable support system according to an embodiment of the present disclosure.

FIG. 19 shows a cross-sectional view of the connection of a portable support 103 into a receiving member 207 from below and a second portable support 103' engaging receiving member 207 from above. In this embodiment, the tapered portion 229 is frictionally engaged with the receiving member 207 and the coupling member 301 is frictionally engaged with the receiving member 207. While the above have been shown with multilevel portions 110 having tapered portions 229 having no latching members 203, the portable supports 103 of the multiple level portions 110 may also have latching members 203, grooves, features, and interlocking features may be utilized to further provide engagement between the portable support 103 and receiving member 207.

Yet another embodiment of the present disclosure includes a system with the portable support 103 attached as part of a fence system. The fence system can be comprised of regular fencing materials, metal sheets, vinyl sheets, plastic sheets, wood panels, or any other material that is able to be affixed to the flat portions of the receiving member 207. An embodiment is to attach metal sheets to the receiving members by using the magnetic panels 227.

Still another embodiment of the present disclosure includes a system with the portable support 103 attached as part of a scaffolding system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A portable support system comprising:
a portable support having a first end and a second end, the first end having a tapered portion, and the second end includes a footing structure; and
a receiving member having a casing including a support cone configured to receive the tapered portion, the support cone having a tapered inner surface and a tapered outer surface, the outer surface and the casing forming a cavity capable of receiving a corresponding tapered footing structure, the inner surface and outer surface being engagable with mating tapered surfaces, at least one of the tapered surfaces being the tapered portion, the receiving member being capable of attachment to one or both of a frame and a panel for use as a platform.

2. The system of claim 1, wherein the portable support further includes a latching feature extending through the tapered portion, the latching feature being actuatable to permit selective engagement and disengagement with a receiving member.

3. The system of claim 1, wherein the receiving member further includes a pin for providing rotational positioning.

4. The system of claim 1, wherein the footing structure is selected from the group consisting of a hook member, a stake member, a post member, a coupling member configured to engage the outer surface of the support cone of another receiving member, and combinations thereof.

5. The system of claim 2, wherein the footing structure includes a coupling member configured to engage the outer surface of the support cone of another receiving member.

6. The system of claim 1 wherein the latching feature is attached to a retention device that is actuated by a releasing mechanism, the releasing mechanism being actuatable by hand.

7. The system of claim 3, wherein the portable support further comprises at least one channel configured to mate the pin and rotationally orient the portable support.

8. The system of claim 1, wherein the geometry of the tapered portion is selected from the group consisting of pyramidal, conical, frusto-conical, and any combinations thereof.

9. The system of claim 1, further comprising a secondary support structure configured to permit the attachment of a secondary support.

10. The system of claim 1 wherein the tapered portion has a frusto-conical geometry.

11. The system of claim 1 wherein the receiving member includes at least one magnetic panel.

12. The system of claim 11, wherein the at least one magnetic panel includes plurality of magnets arranged and disposed to attract and position a mating magnetic panel.

13. A portable platform system comprising:
a frame;
a panel supported by the frame; and
at least one portable support system comprising:
a portable support having a first end and a second end, the first end having a tapered portion, and the second end includes a footing structure; and
a receiving member having a casing including a support cone configured to receive the tapered portion, the support cone having a tapered inner surface and a tapered outer surface, the outer surface and the casing forming a cavity capable of receiving a corresponding tapered footing structure, the inner surface and outer surface being engagable with mating tapered surfaces, at least one of the tapered surfaces being the tapered portion, the receiving member being capable of attachment to one or both of the frame or the panel for use as a platform.

14. The system of claim 13, further comprising a second portable support system, the second portable support system comprising:
a portable support having a first end and a second end, the first end having a tapered portion, and the second end includes a footing structure;

a latching feature extending through the tapered portion, the latching feature being actuatable to permit selective engagement and disengagement with a receiving member; and wherein the receiving member is attached to the frame and includes a support cone configured to receive the tapered portion, wherein the portable support further includes a latching feature extending through the tapered portion, the latching feature being actuatable to permit selective engagement and disengagement with a receiving member.

15. The system of claim 13, wherein the receiving member further includes a pin for providing rotational positioning.

16. The system of claim 13, wherein the footing structure is selected from the group consisting of a hook member, a stake member, a post member, a tapered member, and combinations thereof.

17. The system of claim 16, wherein the footing structure includes a tapered member that is configured to engage a surface of the support cone.

18. The system of claim 13, wherein the portable support further comprises at least one channel configured to mate the pin and rotationally orient the portable support.

19. The system of claim 13, wherein the geometry of the tapered portion is selected from the group consisting of pyramidal, conical, frusto-conical, and any combinations thereof.

20. The portable support in claim 13, wherein the tapered portion has a frusto-conical geometry.

21. The portable support in claim 13, wherein the receiving member includes at least one magnetic panel.

22. The portable support in claim 21, wherein the at least one magnetic panel includes plurality of magnets arranged and disposed to attract and position a mating magnetic panel.

23. A method of assembling a stage comprising:
providing a frame;
providing a panel to the frame; and
attaching a receiving member to one of the frame or the panel;
providing a portable support having a first end and a second end, the first end having a tapered portion, and the second end includes a footing structure, the receiving member having a casing having a support cone configured to receive the tapered portion, the support cone having a tapered inner surface and a tapered outer surface, the outer surface and the casing forming a cavity capable of receiving a corresponding tapered footing structure, the inner surface and outer surface being engagable with mating tapered surfaces, at least one of the tapered surfaces being the tapered portion, the receiving member being capable of attachment to one or both of the frame or the panel for use as a platform; and
directing the portable support into the receiving member to provide engagement therewith.

24. The method of claim 23, wherein the selective engagement and disengagement is provided by hand.

* * * * *